(12) United States Patent
Ogawa

(10) Patent No.: US 7,969,871 B2
(45) Date of Patent: Jun. 28, 2011

(54) COMMUNICATION CONTROL APPARATUS, COMMUNICATION CONTROL METHOD, RECORDING MEDIUM STORING COMMUNICATION CONTROL PROGRAM

(75) Inventor: Jun Ogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 60 days.

(21) Appl. No.: 12/351,485

(22) Filed: Jan. 9, 2009

(65) Prior Publication Data
US 2009/0201814 A1 Aug. 13, 2009

(30) Foreign Application Priority Data
Feb. 8, 2008 (JP) .................... 2008-028847

(51) Int. Cl.
*H04J 1/16* (2006.01)
(52) U.S. Cl. ............ 370/229; 370/230
(58) Field of Classification Search .......... 370/229, 370/230, 235, 241, 259, 252, 356, 360, 395.1, 370/392, 396, 366, 389, 442, 522, 428, 401, 370/402, 463, 469; 709/223, 234, 249; 713/154; 726/22, 13; 455/73, 419, 566; 375/259
See application file for complete search history.

(56) References Cited

U.S. PATENT DOCUMENTS

| | | | | |
|---|---|---|---|---|
| 6,023,563 A * | 2/2000 | Shani ............. | 709/249 |
| 6,041,058 A * | 3/2000 | Flanders et al. ........ | 370/401 |
| 6,122,323 A * | 9/2000 | Johnson .......... | 375/259 |
| 2002/0176391 A1* | 11/2002 | Hermann et al. ........ | 370/338 |
| 2004/0123142 A1* | 6/2004 | Dubal et al. .......... | 713/201 |
| 2005/0141426 A1* | 6/2005 | Hou ................. | 370/235 |
| 2006/0013141 A1* | 1/2006 | Mutoh et al. .......... | 370/241 |
| 2006/0036720 A1* | 2/2006 | Faulk ............... | 709/223 |
| 2006/0067231 A1* | 3/2006 | Ikoma et al. .......... | 370/235 |
| 2008/0212469 A1* | 9/2008 | Woehler et al. ......... | 370/230 |
| 2009/0125714 A1* | 5/2009 | Khosmood et al. ........ | 713/154 |

FOREIGN PATENT DOCUMENTS
JP A 2005-86762 3/2005

OTHER PUBLICATIONS
Catalyst 3750-E and 3560-E Switch Software Configuration Guide, Chapter 26, Feb. 2007.

* cited by examiner

*Primary Examiner* — Aung S Moe
*Assistant Examiner* — Abdullah Riyami
(74) *Attorney, Agent, or Firm* — Greer, Burns & Crain, Ltd.

(57) ABSTRACT

A communication control apparatus has a setting unit for setting a receiving filter for discarding a broadcast frame received continuously not less than a predetermined threshold during a predetermined N number of time slots.

The apparatus has a storage unit for canceling the set receiving filter when receiving the broadcast frame less than the threshold at N+1st time slot after the continuous reception at the N times, and storing the cancellation of the receiving filter. The apparatus has a control unit for not discarding the broadcast frame when the broadcast frame not less than the threshold is received at N+2nd time slot after the N+1st time slot and the cancellation of the receiving frame is stored.

9 Claims, 10 Drawing Sheets

TIME SLOT 10'

FILTER CONTROL FUNCTION IS ON IN SW-4, AND FILTER IS SET IN IF-$A_4$

COMMUNICATION CONTROL APPARATUS, COMMUNICATION CONTROL METHOD, RECORDING MEDIUM STORING COMMUNICATION CONTROL PROGRAM

CROSS-REFERENCE TO RELATED APPLICATIONS

This application is related to and claims priority to Japanese patent application no. 2008-28847 filed on Feb. 8, 2008 in the Japan Patent Office, and is incorporated by reference herein.

BACKGROUND OF THE INVENTION

1. Field of the Invention

The present application relates to a technique which controls broadcast storms caused by generation of a lot of broadcast frames and multi-cast frames in a communication system.

2. Description of the Related Art

If broadcast frames use up too much bandwidth of a LAN, the network goes down. This situation is a so-called broadcast storm, and it becomes an operational problem of IT systems.

Figure 4:
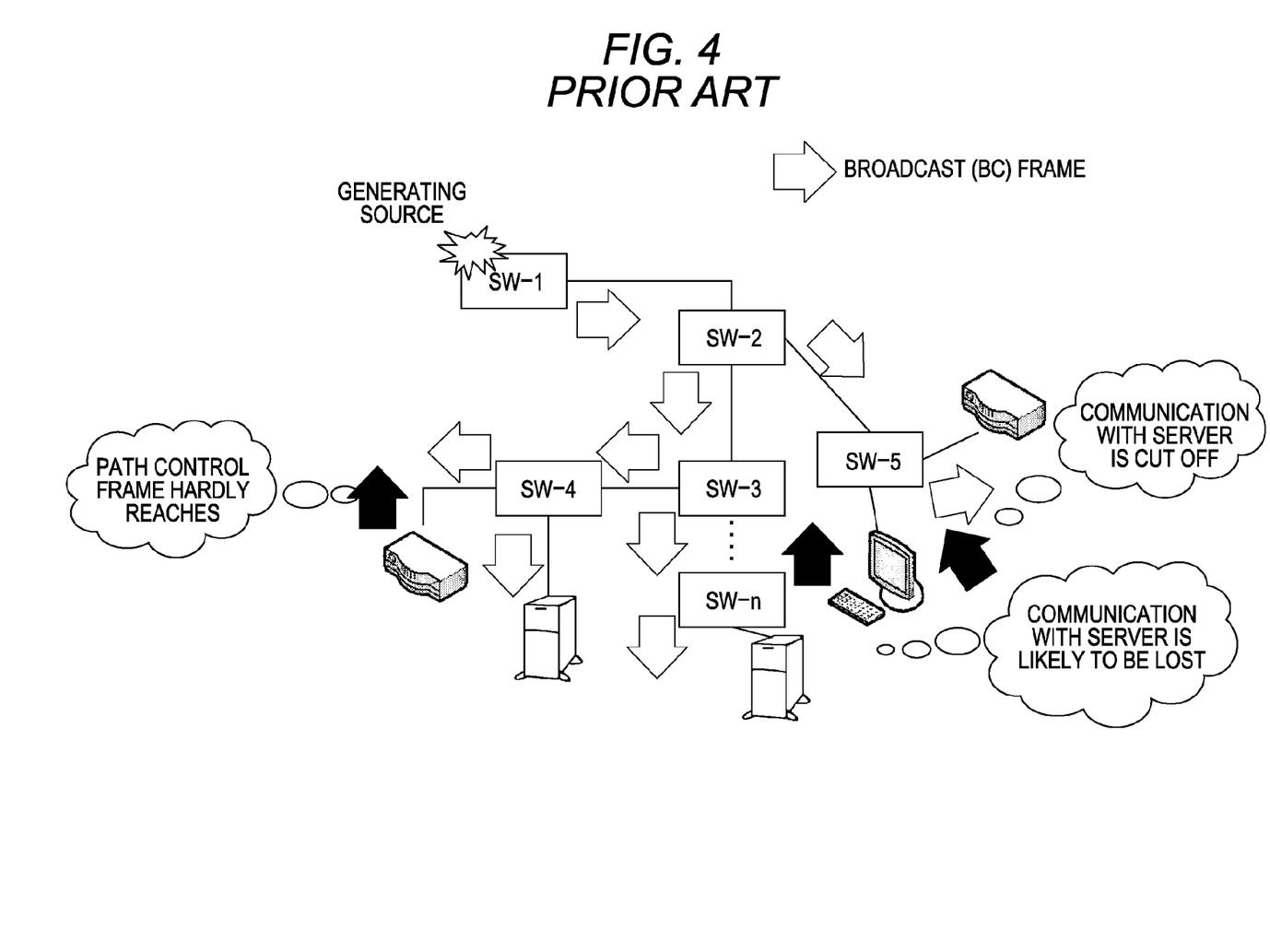
FIG. 4 is diagram illustrating generation of BC frames from a SW-1.

The broadcast storm can be generated, for example, due to false connection of a cable to an L2-Switch (hereinafter, L2-SW) or a failure of an L2-SW. As shown in FIG. 4, when the broadcast storm uses up bandwidth, not only communication between a server and a client or between a server and a server but also control packets between routers are disconnected. For this reason, abnormality of path control in an IT system is caused, which results in multiple failures.

Figure 5:
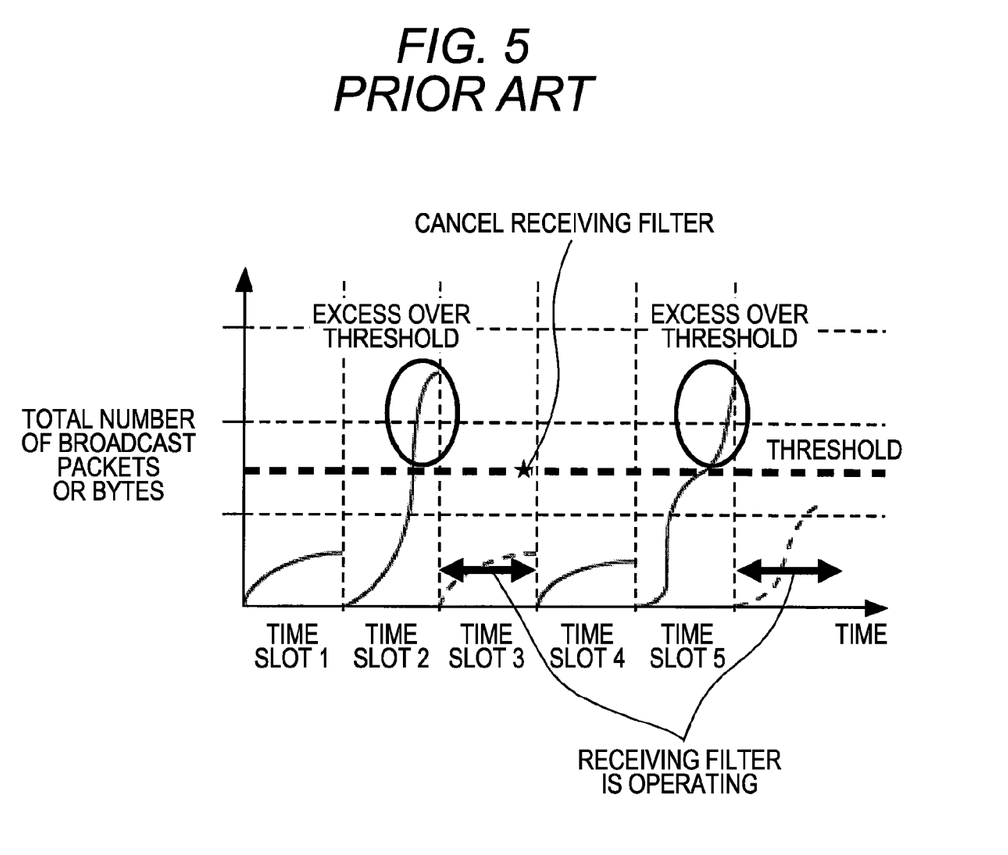
FIG. 5 is a diagram illustrating a relationship among a threshold of the BC frames, ON setting and OFF setting of receiving filters at each time slot.

As shown in FIG. 5, there is a conventional technique which represses broadcast storms. A receiving filter (a filter which discards received data) is set for each interface of each L2-SW. The number of packets or bytes of the broadcast frames (hereinafter, BC frame) and the multi-cast frames (hereinafter, MC frame) is counted, and a total value per time slot is calculated. The time slot is a unit of predefined period (for example, one sec). When the total value exceeds a predetermined threshold, a receiving filter (a filter which discards received data) for the BC frames and the MC frames is set in an interface where excess over a threshold occurs.

A technique relating to a bridge apparatus eliminates a double path caused by a loop, so as to repress an unstable state of a network and be capable of preventing deterioration of transmission service of the network.

An operation of a switch (hereinafter, SW) having a storm control function in a conventional interface is described according to a time slot with reference to FIG. 5. The storm control function monitors the number of received frames in the BC frames or the MC frames, and detects abnormal traffic when the number of received frames exceeds a prescribed threshold.

At time slot 1, the number of received frames in the BC frames and the MC frames does not exceed the threshold, and thus normal operation is performed or only a frame of a control system is communicated on a network.

At time slot 2, when the SW detects that the number of the BC frames and the MC frames exceeds the threshold, the SW sets the receiving filter (which discards the BC frames and the MC frames) to ON at the next time slot for the interface where the excess over the threshold is detected.

At time slot 3, when the received BC frames and MC frame do not exceed the threshold, the SW sets the receiving filter to OFF (cancel the receiving filter) at the next time slot. Even when the receiving filter is set, the SW continues counting the flow rate of communication.

At time slot 4, since the received BC frames and MC frames do not exceed the threshold, the receiving filter of the SW is kept OFF at the next time slot.

At time slot 5, when the SW detects that the frames exceed the threshold in any interface, the SW sets the receiving filter to ON similarly to time slot 2.

The receiving filter which is set by the storm control function is a filter for a destination MAC address, and its filter conditions are as follows:

a frame where MAC is a broadcast address (FF-FF-FF-FF-FF-FF) is to be discarded;
a frame where MAC is MC address "01-00-5E-00-00-00" to "01-00-5E-7F-FF-FF" is to be discarded (this range includes an address for a path post frame of OSPF (one of an IP path control method); and
an address of a control system multi-cast frame of a layer 2 such as BPDU is not to be discarded.

The storm control function, however, produces a problem when a filter is set for excessive interfaces.

Figure 6:
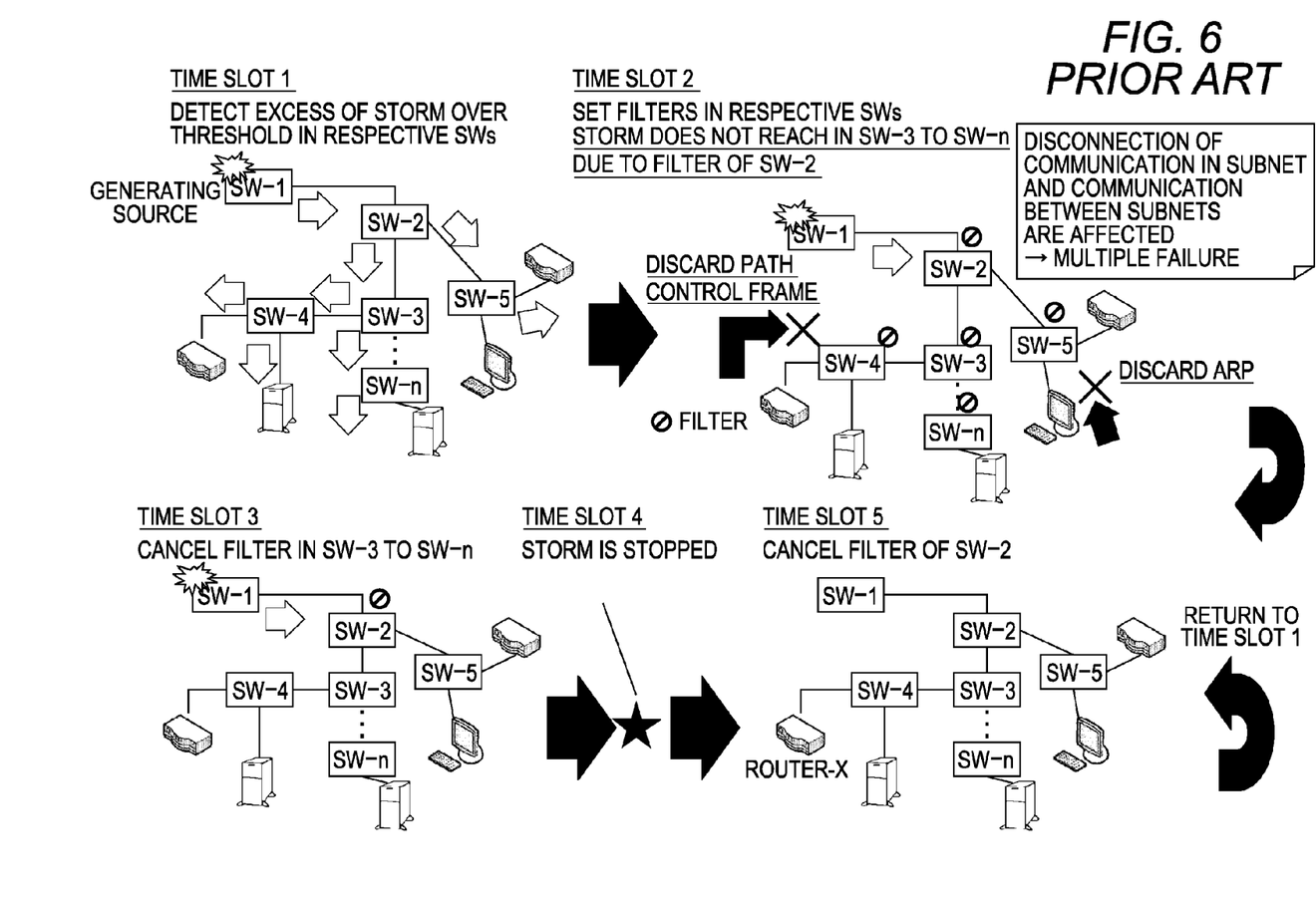
FIG. 6 is a diagram illustrating transition of the network composed of a conventional L2-SW at each time slot.

FIG. 6 illustrates an operation of the storm control function provided to the conventional SW in the whole network, and this problem is described. The storm control function is ON and the filter function is effective in all the interfaces of SWs.

At time slot 1, a storm is caused by generation of many BC frames (or MC frames) generated from the SW-1 due to failure of the first SW (hereinafter, the n-th SW is described as SW-n). Each SW detects that the BC frames or the MC frames exceed the threshold in an interface (SW-1-side interface) which receives the storm.

At time slot 2, the receiving filter is set to ON for the BC frames in the interface where excess of the BC frames over the threshold is detected. At this time slot, the SW-1 is still transmitting the storm, but the BC frames are discarded by the receiving filter of the SW-2. For this reason, the SW-3 to SW-n do not detect the storm. That is to say, the excess over the threshold does not occur in the SW-3 to SW-n.

At time slot 3, the ON state of the receiving filter in the SW-1-side interface of the SW-2 is continued, and the receiving filters in the SW-1-side interfaces of the SW-3 to SW-n are cancelled (the receiving filters are set to OFF).

At time slot 4, the storm generated from the SW-1 is stopped. Therefore, the BC frames do not exceed the threshold at SW-2.

At time slot 5, the SW-2 cancels the setting of the receiving filter in the SW-1-side interface (the SW-2 sets the receiving filter to OFF).

Thereafter, when a storm is generated from the SW-1 intermittently due to a failure of the SW-1, for example (it is highly probable that the storm is generated or stopped from the SW-1 at a periodic interval due to the failure of the SW-1 and the like), a current state is returned to the state of time slot 1.

A problem in the example of FIG. 6 is time slot 2 after the state is returned to the state of time slot 1. That is to say, the storms which are generated from the SW-1 intermittently are discarded by setting the receiving filter to ON at the SW-2. For this reason, after the BC frames are discarded at SW-2, the receiving filters at the SW-3 to SW-n are not substantially necessary. Further, since the BC frames and the MC frames necessary for the communication such as ARP (Address Resolution Protocol) and path control frames are discarded by the SW-3 to the SW-n, this causes multiple failures.

This is because the storm control function does not take a positional relationship between the respective SW and a generating source into consideration, and sets the receiving filter based on only the flow rate of storms as information for making a decision.

In order to solve the above problems, it is an object to provide a technique which controls a communication system so that a receiving filter for storms from one generating source is set only in a SW closest to the generating source, and receiving filters are not set in the other SWs.

SUMMARY

A communication control apparatus has a setting unit for setting a receiving filter for discarding a broadcast frame not less than a predetermined threshold when receiving the broadcast frame continuously in a predetermined N number of time slots. The apparatus has a storage unit for canceling a previously set receiving filter when receiving less than the threshold at the N+1st time slot after the continuous reception at the N time slots, and storing the cancellation of the receiving filter. The apparatus has a control unit for not discarding the broadcast frame when the broadcast frame not less than the threshold is received at the N+2nd time slot after the N+1st time slot and when the cancellation of the receiving frame is stored.

DESCRIPTION OF THE PREFERRED EMBODIMENTS

Figure 1:
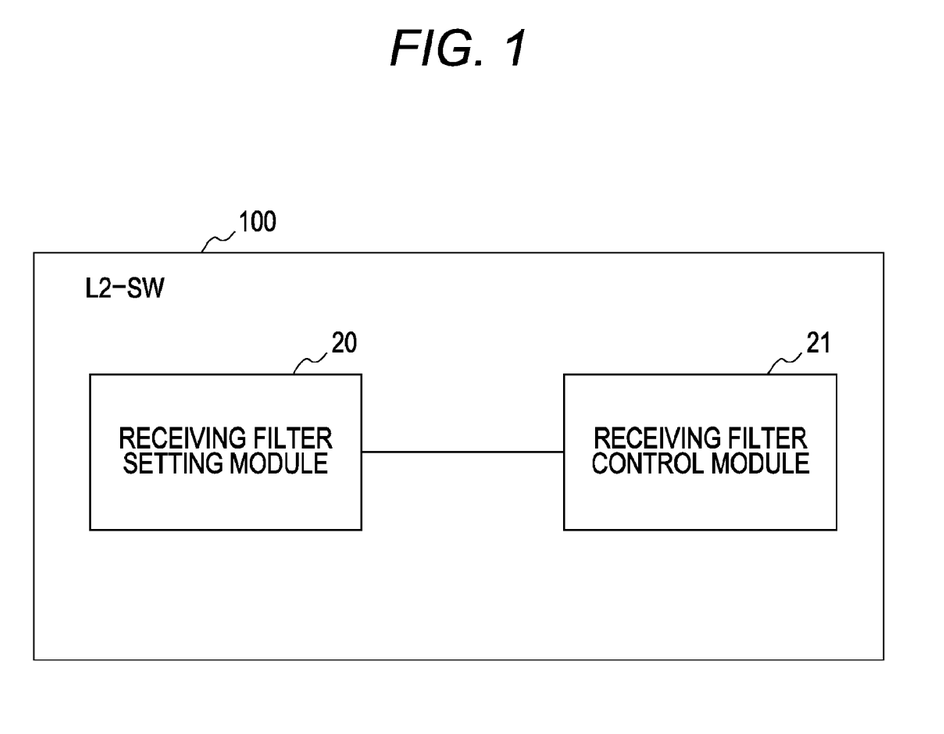
FIG. 1 is a diagram illustrating one example of a function block of an L2 switch according to a present embodiment.

A function block of an L2 switch according to a present embodiment is described with reference to FIG. 1.

The L2 switch 100 (hereinafter, L2-SW 100) (communication control apparatus) has a receiving filter setting module 20 (setting unit), and a receiving filter control module 21 (storage unit, control unit, reset unit). Processes in the receiving filter setting module 20 and the receiving filter control module 21 are realized in such a manner that a CPU, not shown, provided to the L2-SW 100 executes firmware stored in a storage medium such as a nonvolatile memory, not shown, provided to the L2-SW 100. The storage medium stores parameters such as a threshold, a period interval of one time slot and the time until cancellation of a filter is reset, described later, therein. Further, the L2-SW 100 has a timer which manages time (not shown in FIG. 1).

The receiving filter setting module 20 sets an ON/OFF state of the receiving filter for discarding BC frames per interface unit. When the receiving filter setting module 20 receives broadcast frames or multi-cast frames (hereinafter, they are called as BC frames) (broadcast frames), which exceed a threshold and cannot be generated in a normal system operation, continuously at predetermined N-number of time slots, it sets the receiving filter as a filter for an MAC address to ON. In the present embodiment, the number of time slots N is 1, but the numerical value is not limited.

When the BC frames which exceed the threshold are not received, the receiving filter control module 21 cancels the set receiving filter at the N+1st time slot after the continuous reception at the N times. The cancellation of the receiving filter is stored as a flag in the storage medium. Even when the receiving filter control module 21 receives the BC frames which exceed the threshold at the N+2nd time slot after the N+1st time slot, the BC frames are not discarded if the cancellation of the receiving filter is stored (if it is set as a flag).

When the receiving filter control module 21 does not receive the BC frames which exceed the threshold, it resets the cancellation of the receiving filter. The time slots are counted by the receiving filter control module 21, and even when the receiving filter is cancelled, the time slots are counted.

That is to say, when the number of time slots is less than a predetermined number of time slots, the receiving filter control module 21 sets a filter control function to OFF, and the receiving filter setting module 20 sets the receiving filter to OFF (cancel).

The filter control function controls whether the function for setting ON/OFF of the receiving filter per interface unit by means of the receiving filter setting module 20 is turned ON or OFF. That is to say, the filter control function OFF means that when the flag showing the cancellation of the receiving filter is stored in the storage medium, the setting function of the receiving filter setting module 20 is brought into the OFF state so that the BC frames are not discarded. The filter control function ON means a control such that the setting function of the receiving filter setting module 20 is operated effectively.

The receiving filter control module 21 counts the number of time slots which exceed the threshold, and when the number of time slots is not less than the predetermined number of time slots, the filter control function is still ON. Even when the filter control function is OFF, the receiving filter control module 21 continues the counting of the number of time slots exceeding the threshold. When the number of time slots is less than the predetermined number of time slots, the filter control function is continued to be OFF.

An outline of the function of the L2-SW 100 according to the present embodiment is described below. As described above with reference to FIG. 6, when a storm is transmitted for m time slots (m=the number of time slots at which the storm continues), the following properties are provided due to a positional relationship between a generating source and the respective SWs:

storm for one time slot (time slot 1 in FIG. 6) is detected at the SW (SW-2 in FIG. 6) closest to the generating source and the SWs other than that SW (other than SW-2 in FIG. 6); and storm for m time slots is detected only at the SW in FIG. 6) closest to the generating source.

Figure 2:
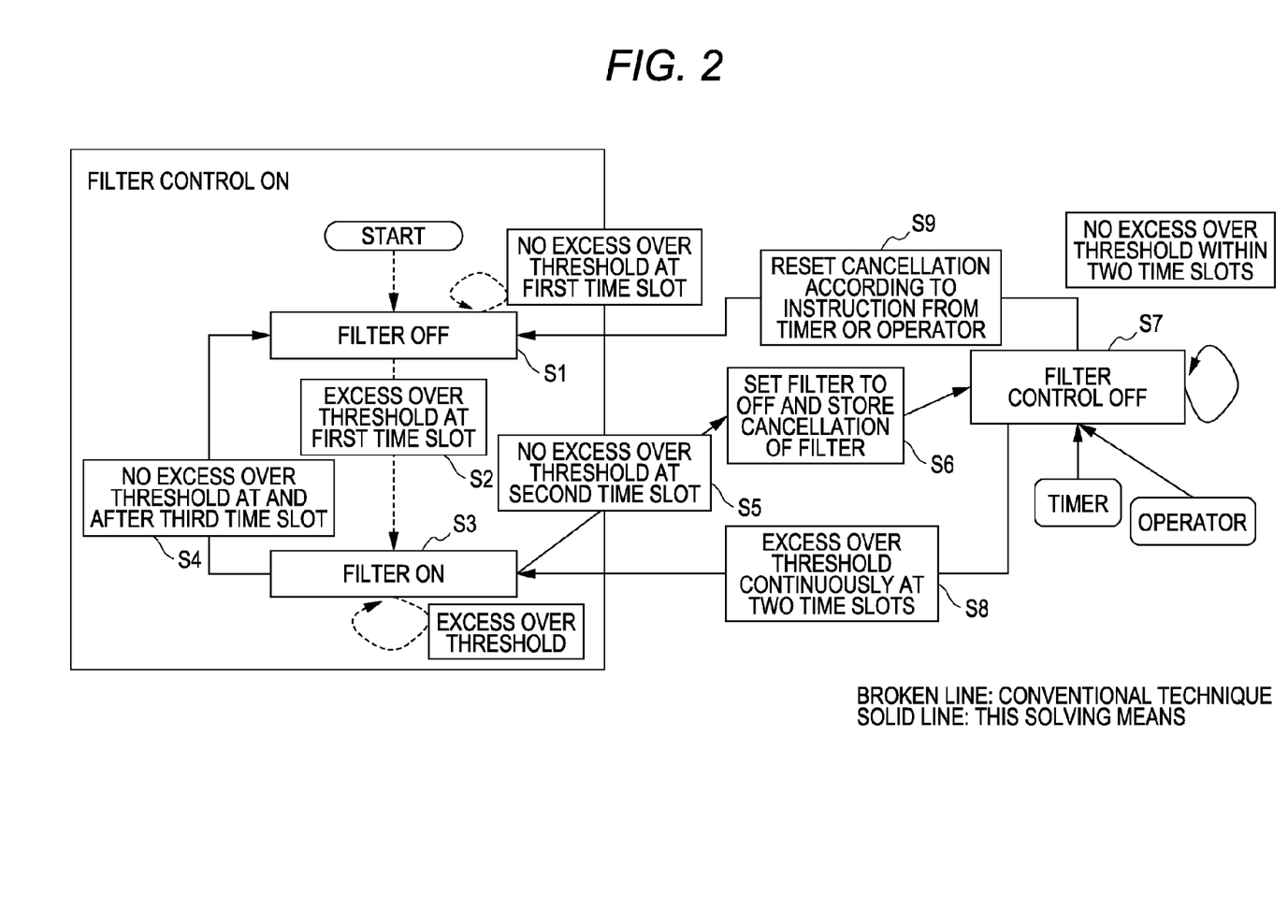
FIG. 2 is a flow chart illustrating a process and state transition of the L2 switch according to the present embodiment.

The L2-SW 100 gives a portion shown by a solid line in the flow chart of FIG. 2 (illustrating the process and state transition) to a conventional storm control function using the above properties, so that the respective SWs autonomously learn the positional relationship between the generating source and the SWs and set the setting function of the receiving filter setting module 20 to ON/OFF autonomously. The flowchart in FIG. 2 will now be described in more detail with reference to conditions of the respective time slots shown in FIGS. 3A to 3E.

Figure 3A:
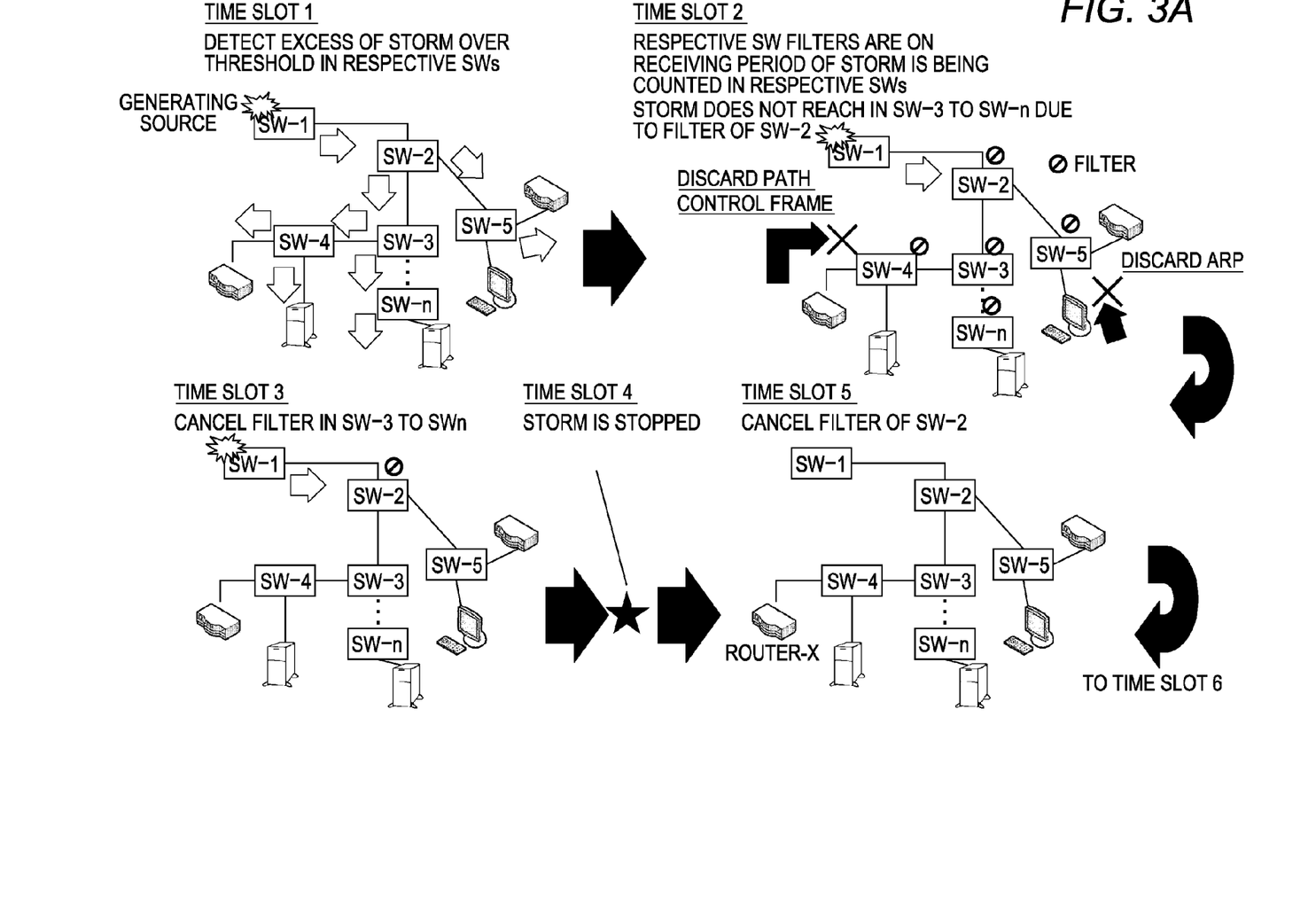
FIG. 3A is a diagram illustrating transition of a network composed of an L2-SW 100 at each time slot according to the present embodiment (time slots 1 to 5)
Figure 3B:
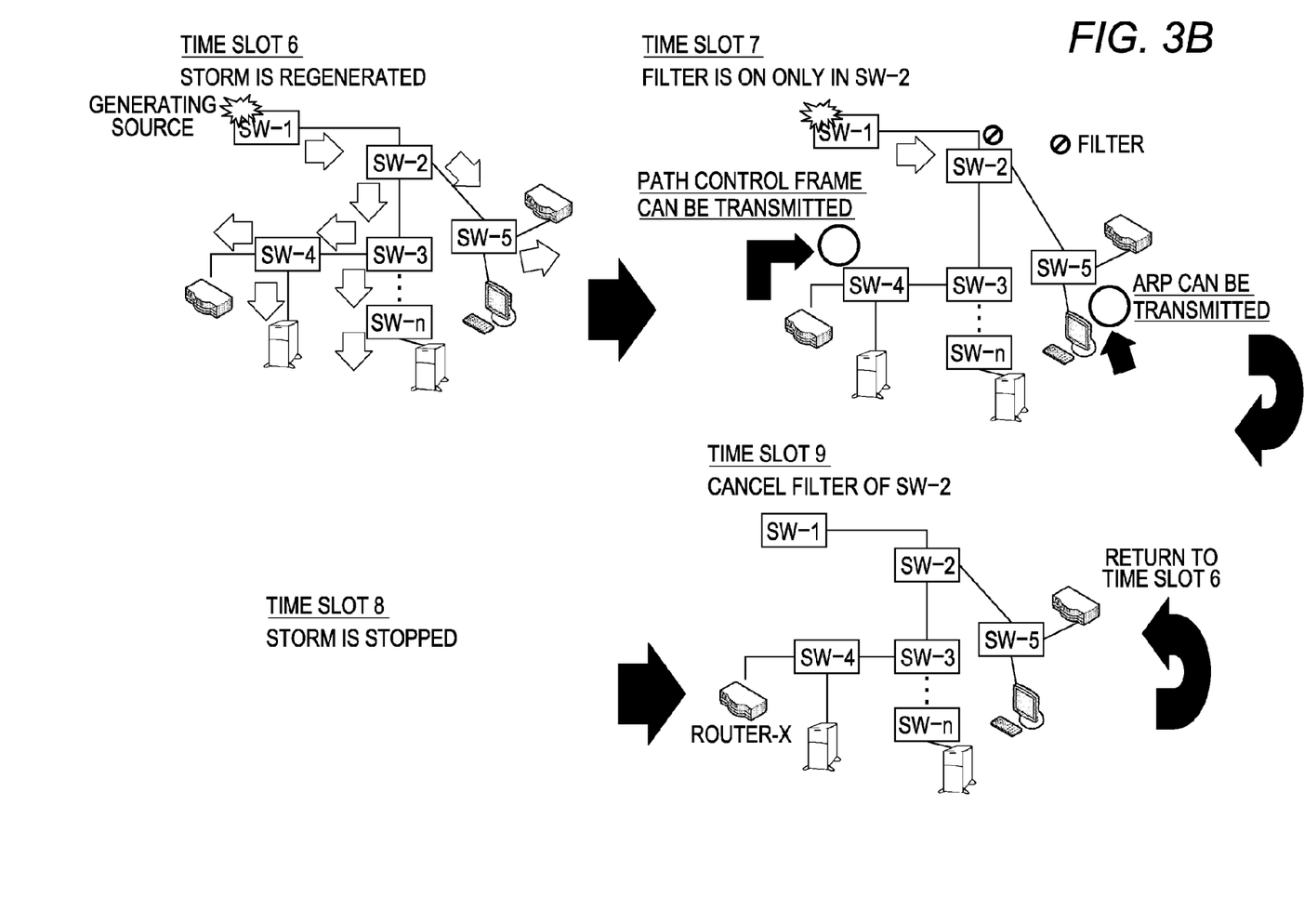
FIG. 3B is a diagram illustrating transition of the network composed of the L2-SW 100 at each time slot according to the present embodiment (time slots 6 to 9)

FIGS. 3A and 3B illustrate states until all the SWs autonomously learn the relationship between the SWs and the generating source and set the setting function of the receiving filter setting module 20 to ON/OFF at each time slot in the network having the function of the L2-SW 100. In FIGS. 3A and 3B, the SW-1 generates the storm intermittently. The process on the SW-1-side interface of the SW-2 as the SW closest to the generating source in FIGS. 3A and 3B transits to steps S1, S2, S3 and S4 in FIG. 2. The processes on the SW-1-side interfaces of the SW-3 to the SW-n which are not the closest to the generating source transit to steps S1, S2, S3, S5, S6 and S7 in FIG. 2.

The storm is generated from the SW-1 as the generating source at time slot 1. At time slot 1, the receiving filters of the respective SWs are in the OFF state (step S1). The respective SWs detect excess over the threshold in the SW-1-side interfaces (step S2).

The receiving filter setting modules 20 of the respective SWs set the receiving filters for BC frames to ON in the SW-1-side interfaces just before time slot 2 (step S3). When the receiving filters are set, since the receiving filter of the SW-2 closest to the generating source is set, BC storm does not reach the SW-3 to SWn. Since the receiving filters are set, the SW-3 to SW-n discard ARP and path control frames necessary for communication.

Therefore, the SW-1 is still transmitting the storm at time slot 2, but the receiving filter of the SW-1-side interface of the SW-2 discards the BC frames. For this reason, the excess over the threshold is not detected in the SW-1-side interfaces of the SW-3 to the SW-n (step S5).

Since the SW-1 is continuously transmitting the storm at time slot 3, the ON setting of the receiving filter continues in the SW-2 (loop of step S3 in FIG. 2). On the other hand, the SW-1-side interfaces of the SW-3 to the SW-n detect the excess over the threshold only for one time slot, namely, time slot 1. For this reason, the SW-3 to the SW-n learn that they are not the closest to the generating source. That is to say, the receiving filter setting modules 20 of the SW-3 to the SW-n set the receiving filters to OFF just before time slot 3, and then the receiving filter control modules 21 of the SW-3 to the SW-n store the cancellation of the receiving filters as flags in the storage medium (step S6). Even when the receiving filter control modules 21 of the SW-3 to the SW-n detect the BC frames which exceed the threshold at subsequent time slots, if the cancellation of the receiving filters is stored, they make a control so that the BC frames are not discarded (the filter control function is OFF) (step S7).

The storm generated from the SW-1 as the generating source is stopped at time slot 4. When the excess over the threshold does not occur in the SW-1-side interface of the SW-2, the receiving filter setting module 20 of the SW-2 sets the receiving filter setting in the SW-1-side interface to OFF at time slot 5 (step S4, step S1).

The storm is again generated from the SW-1 as the generating source at time slot 6. The excess over the threshold is detected in the SW-1-side interface of the SW-2 (step S2), and the receiving filter in the SW-1-side interface of the SW-2 is set to ON at time slot 7 (step S3).

On the other hand, since the SW-3 to the SW-n learn that they are not the closest to the storm generating source at time slot 3, the receiving filter control modules 21 set the filter control functions in the SW-1-side interfaces to OFF at time slots 6 and 7. The SW-3 to the SW-n can transmit BC frames even when the second storms are generated. Even when the storm control function is off, the number of packets or the number of bytes of the received frames is counted. Therefore, the ARP or the path control frames discarded at time slot 2 can be transmitted.

The storm generated from the SW-1 as the generating source is stopped at time slot 8, and the excess over the threshold does not occur in the SW-1-side interface of the SW-2. The receiving filter setting module 20 of the SW-2 sets the receiving filter in the SW-1-side interface to OFF at time slot 9 (step S4, step S1).

The storm control functions in the SW-3 to the SW-n are OFF from time slot 4 to time slot 9 (still step S7).

The process at time slot 1 to time slot 5 is similar to that in the conventional technique other than that the respective SWs learn whether they are the SW closest to the generating source during a storm receiving period. However, in the case of intermittent failure, the network is repeatedly in the state of time slot 2 in the conventional technique, so that control frames such as a path control frames or ARP necessary for the communication are discarded. However, in the L2-SW 100 according to the present embodiment, only the receiving filter in the SW closest to the generating source is always set according to the learned results of the SWs like time slot 7 after the state of time slot 2, and the frame transmission in the network from the SW-3 to the SW-n is not influenced.

Figure 3C:
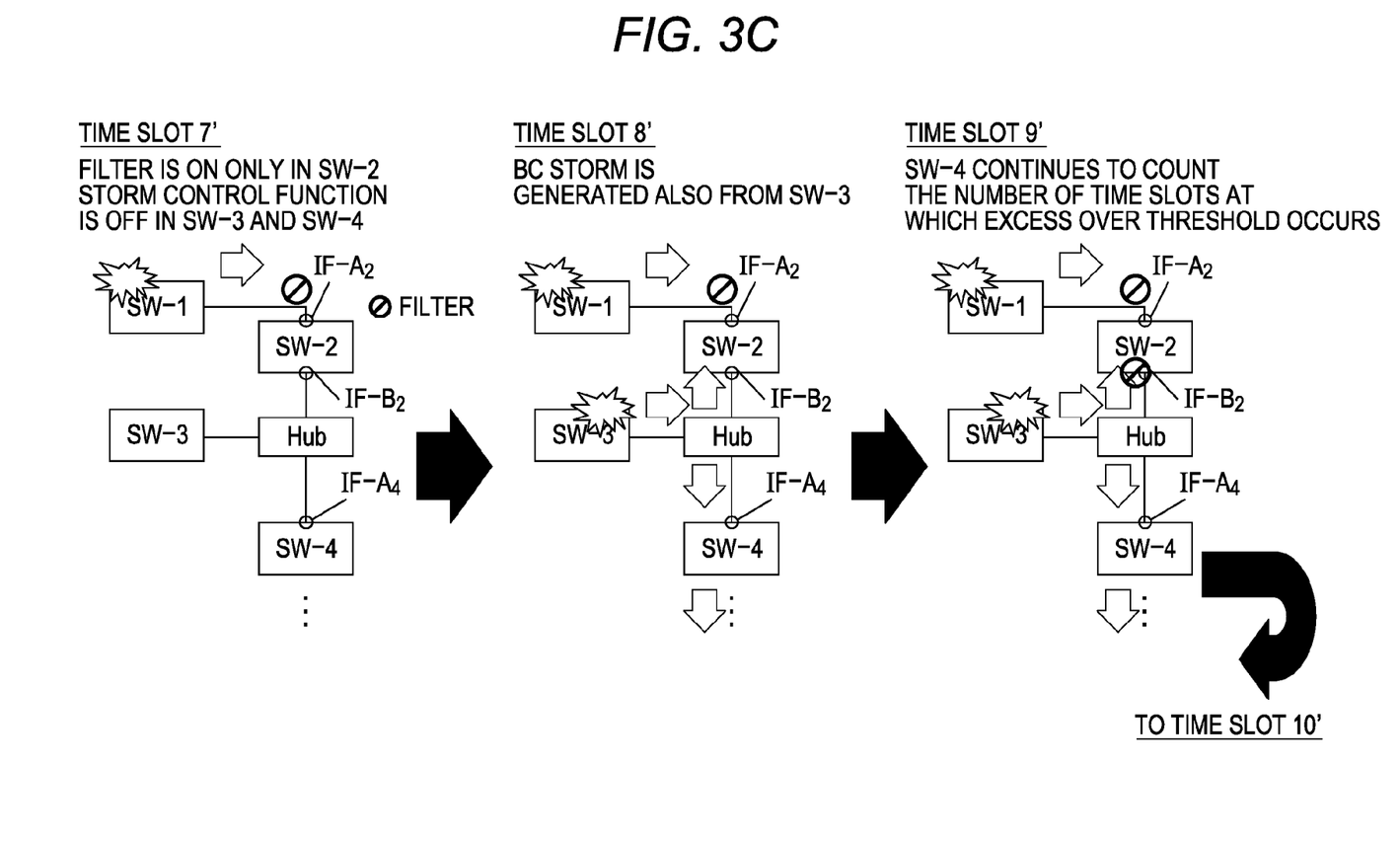
FIG. 3C is a diagram illustrating transition of the network composed of the L2-SW 100 at each time slot according to the present embodiment (time slots 7' to 9')
Figure 3D:
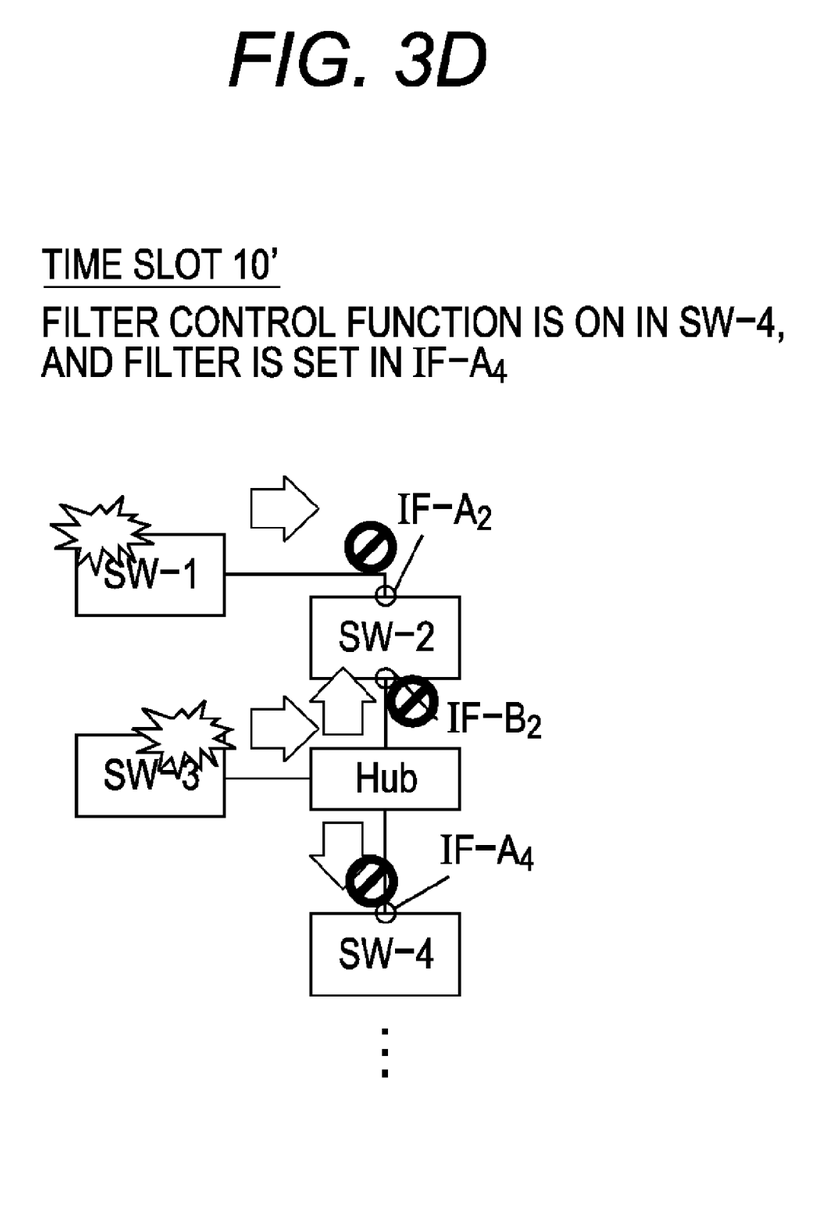
FIG. 3D is a diagram illustrating transition of the network composed of the L2-SW 100 at each time slot according to the present embodiment (time slot 10')

A case where the storm is generated from a plurality of generating sources is described below. It is different from network configuration of FIGS. 3C, 3D and network configuration of FIGS. 3A, 3B for convenience of explanation, that is to say, SW-1 in FIG. 3C isn't SW-1 in FIG. 3a. The network constitution is as shown at each time slot in FIGS. 3C and 3D. At time slot 7' in FIG. 3C, as a result of the generation of the storm from the SW-1, the process from time slot 1 to time slot 6 is executed by the SW-2 and the SW-4, as described in FIGS. 3A and 3B.

That is to say, the filter control function of the SW-1-side interface of the SW-2 (hereinafter, IF-A2) is ON at time slot 7', and the receiving filter is set to ON. The filter control function is OFF in the SW-1-side interface of the SW-4 (hereinafter, IF-A4). Further, in the SW-3-side interface (hereinafter, IF-B2) of the SW-2, the filter control function is set to ON and the receiving filter is set to OFF at time slot 7'. Thereafter, storm is generated from the SW-3 at time slot 8'.

In the following description, the process of the IF-B2 transits to steps S1, S2 and S3 in FIG. 2, and the process of the IF-A4 of the SW-4 transits to steps S7, S8 and S3. Their details are described below.

The receiving filter of the IF-A2 is set to ON for BC frames at time slot 7'. On the other hand, the receiving filter of a IF-B2 is set to OFF (step S1). The setting of the receiving filter and the control of the receiving filter control module 21 can be provided for each interface as described above. As a result of the learning, the filter control function of the receiving filter control module 21 is OFF in a IF-A4 of the SW-4 (step S7).

Storm is generated from the SW-3 as the generating source at time slot 8'. Storm is generated ongoingly from the SW-1 as the generating source. The SW-2 and the SW-4 start to count the number of time slots at which the excess over the threshold occurs in the interfaces (first time slot).

Since the SW-2 detects the excess over the threshold in the IF-B2 at time slot 8' (step S2), the receiving filter setting module 20 of the SW-2 sets the receiving filter of the IF-B2 to ON at time slot 9' (step S3). On the other hand, in the SW-4, the receiving filter control module 21 uses the result of detecting the excess over the threshold at two continuous time slots as information for making a decision on the setting of the filter control function from OFF to ON. For this reason, the number of time slots at which the excess over the threshold occurs in the IF-A4 is continuously counted (second time slot).

In the receiving filter control module 21 of the SW-4, since the excess over the threshold occurs continuously at two time slots, namely, at time slots 8' and 9', the filter control function is set to ON so that the setting function of the receiving filter setting module 20 is enabled at time slot 10' (see FIG. 3D) (step S8). The receiving filter setting module 20 of the SW-4 sets the receiving filter of the IF-A4 for BC frames to ON (step S3).

The L2-SW 100 according to the present embodiment can control storms even when a plurality of storm generating sources is present.

The process for resetting the cancellation of the receiving filter by means of the receiving filter control module 21 (the process for resetting the learned result) is described below.

Figure 3E:
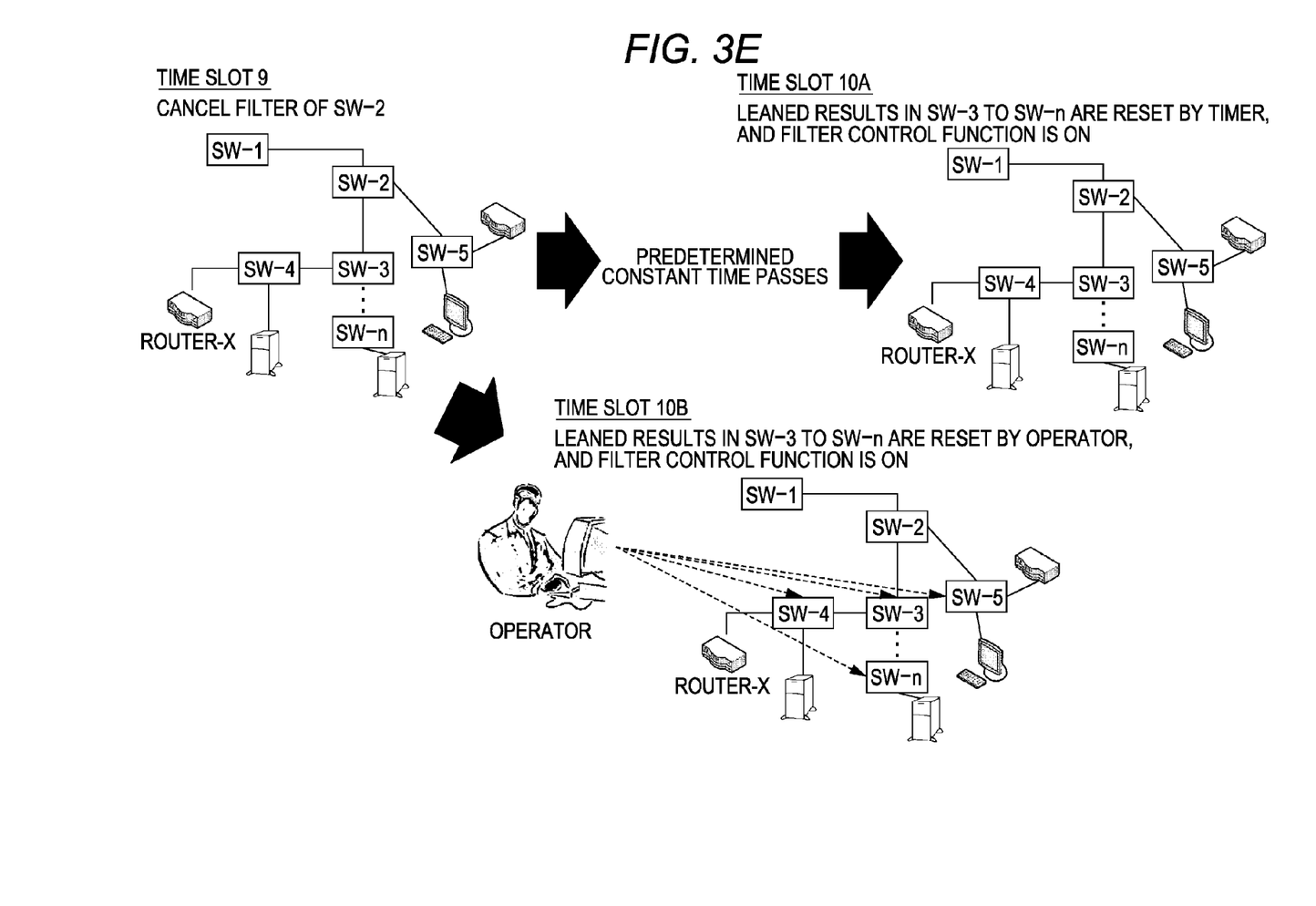
FIG. 3E is a diagram illustrating transition of the network composed of the L2-SW 100 at each time slot according to the present embodiment (time slots 9, 10A and 10B)

FIG. 3E illustrates time slots at the time when control of the receiving filter control module 21 is reset. The process transitions of the SW-1-side interfaces of the respective SWs in FIG. 3E correspond to steps S7 and S9 in the flowchart of FIG. 2. The time slot 9 is the same as the time slot 9 in FIG. 3B.

Time slot 10A shows a state in which the excess over the threshold does not occur within a predetermined time from time slot 9. The predetermined time is a period which is at least longer than a time slot (for example, about 5 minutes to 10 minutes), but its numerical value is not limited. In the state of time slot 10A, the receiving filter control modules 21 of the SW-3 to the SW-n reset the filter control function according to an instruction from the timer which counts the predetermined time (step S9), so as to set the filter control functions of the SW-1-side interfaces to ON. The receiving filter setting modules 20 set the receiving filter to OFF (step S1). The resetting is realized by resetting the flags in the storage medium.

On the other hand, time slot 10B describes a condition in which an instruction from an operator is performed after time slot 9. The operator instructs the SW-1-side interfaces of the SWs to reset the filter control functions of the receiving filter control modules 21 to OFF at time slot 10B (step S9). As a result, the receiving filter control modules 21 of the SWs set the filter control functions of the SW-1-side interfaces to ON, and the receiving filter setting modules 20 set the receiving filters to OFF (step S1).

In the present embodiment, it is assumed that time slots in the SWs are synchronous with one another, but when time slots are not synchronous with one another in the SWs, parameters for time slots necessary for the state transition in FIG. 2 can be changed suitably (for example, the number of time slots at which the state transits is changed).

In the present embodiment, the L2 switch is described as the communication control apparatus, but switches having the other systems (for example, the L3 switch) or the other communication control apparatus such as a router can be applied.

According to the present embodiment, in addition to the storm detection using the threshold, the period during which the storm is received is added to information for determining the necessity of filter control. Therefore, the SWs autonomously learn/determine whether they are the closest to the generating source, and can determine an appropriate process for filter control. As a result, unnecessary discard of control frames having broadcast/multi-cast address is repressed, and thus multiple failure can be repressed.

A program which executes the respective steps in a computer acting as the communication control apparatus can be provided as a communication control program. Such a program is stored in a storage medium readable by the computer so as to be capable of being executed by the computer. The storage medium readable by the computer includes internal storage devices, such as a ROM and a RAM, which are packaged into the computer, portable storage media such as a CD-ROM, a flexible disc, a DVD disc, a magneto-optical disc and an IC card, a database which retains a computer program, or another computer and its database.

What is claimed is:

1. A communication control apparatus comprising:
   a setting unit configured to start discarding a broadcast frame or a multicast frame received within a first period when a number of broadcast frames or a multicast frames received within a second period is higher than a predetermined number, and configured to cancel the discarding when a number of broadcast frames or multicast frames received within a third period is lower than the predetermined number; and
   a control unit configured not to start discarding a broadcast frame or a multicast frame received within a fourth period when a number of broadcast frames or multicast frames received within a fifth period after the canceling is lower than the predetermined number and a number of broadcast frames or multicast frames received within a sixth period is higher than the predetermined number again because the control unit determines that the communication control apparatus is not closest to a source generating more than the predetermined number of broadest frames or multicast frames.

2. The device according to claim 1, further comprising:
   a reset unit for resetting the cancellation of the discarding when the number of broadcast frames higher than the predetermined number is not received for a predetermined time.

3. The device according to claim 1, wherein the discarding is performed by a filter for a MAC address.

4. A communication control method comprising:
   a setting procedure of a control apparatus starting to discard a broadcast frame or a multicast frame received within a first period when a number of broadcast frames or multicast frames received within a second period is higher than a predetermined number and cancel the discarding when a number of broadcast frames or multicast frames received within a third period is lower than the predetermined number; and
   a control procedure of the control apparatus not starting to discard a broadcast frame or a multicast frame received within a fourth period when a number of broadcast frames or multicast frames received within a fifth period after the canceling is lower than the predetermined number and a number of broadcast frames or multicast frames received within a sixth period is higher than the predetermined number again because the control apparatus is not closest to a source generating more than the predetermined number of broadest frames or multicast frames.

5. The method according to claim 4, further comprising:
a reset procedure of resetting the cancellation of the discarding when the number broadcast frames higher than the predetermined value is not received for a predetermined time.

6. The method according to claim 4, wherein the filter for a MAC address performs the discarding.

7. A non-transitory computer-readable recording medium storing a communication control program containing instructions that, when executed on a computer, cause the computer to execute:
starting to discard a broadcast frame or a multicast frame received within a first period when a number of broadcast frames or multicast frames received within a second period is higher than a predetermined number and canceling the discarding when a number of broadcast frames or multicast frames received within a third period is lower than the predetermined number; and
a step of refraining from discarding a broadcast frame or a multicast frame received within a fourth period when a number of broadcast frames or multicast frames received within a fifth period after the canceling is lower than the predetermined number and a number of broadcast frames or multicast frames received within a sixth period is higher than the predetermined number again because the computer is not closest to a source generating more than the predetermined number of broadest frames or multicast frames.

8. The non-transitory computer-readable recording medium according to claim 7, the program further causing the computer to execute:
a reset procedure of resetting the cancellation of the discarding when the number of broadcast frames higher than the predetermined number is not received for a predetermined time.

9. The non-transitory computer-readable recording medium according to claim 7, wherein a filter for a MAC address performs the discarding.

* * * * *